United States Patent [19]
Buck

[11] Patent Number: 5,832,728
[45] Date of Patent: Nov. 10, 1998

[54] PROCESS FOR TRANSMITTING AND STORING ENERGY

[76] Inventor: Erik S. Buck, 9905 E. 60th St. #6, Raytown, Mo. 64133-3945

[21] Appl. No.: 848,213

[22] Filed: Apr. 29, 1997

[51] Int. Cl.⁶ .................................................. F16D 31/02

[52] U.S. Cl. .............................. 60/407; 60/456; 60/649; 60/653; 60/659; 60/674

[58] Field of Search ........................... 60/659, 649, 673, 60/674, 650, 684, 653, 456, 407, 410

[56] References Cited

U.S. PATENT DOCUMENTS 3,967,466  7/1976  Edwards ................................. 62/402

*Primary Examiner*—Edward K. Look
*Assistant Examiner*—Bijan N. Karimi
*Attorney, Agent, or Firm*—Joseph G. Nauman

[57] ABSTRACT

A process for transmitting or storing energy in which a gasseous working fluid is compressed and cooled, relative to isentropic compression, by a coolant. The energy used to perform the compression is recovered by expansion, while heat from the coolant is used to reheat the working fluid, thus maximizing efficiency.

8 Claims, 4 Drawing Sheets

5,832,728

PROCESS FOR TRANSMITTING AND STORING ENERGY

BACKGROUND—FIELD OF THE INVENTION

This invention consists of an improved method (process) of energy storage, whether fleetingly, as in power transmission from one point to another, or more lastingly, as in load leveling for utilities, for storing solar or wind energy for dark or calm periods, or for powering "zero emissions" vehicles.

BACKGROUND OF THE INVENTION

Existing energy storage processes, especially those applicable to powering mandated "zero emissions" vehicles, are few. Flywheels are hardly "existing" technology. Electrochemical storage batteries have disadvantages and will be discussed later. Systems depending on gravity only work when going downhill. Obvious, but not fashionable, alternatives to batteries are compressed gasses, air or steam, as a storage medium for energy. For purposes of illustration, these processes will be described in the context of a "zero emissions" vehicle, as mandated by law in some places.

Both steam and compressed air have been used for well over a century. Fireless railroad locomotives, refilled with steam from a stationary boiler, could shunt cars for half a day between refills. Compressed air is still widely used as an energy storage medium, from air rifles to heavy mining equipment, even for utility load leveling in a few cases. At least one compressed air car is in use in Joplin, Mo.

There are two measures of merit which apply. One is the amount of useful energy which can be stored in a given volume, energy density. Higher is better; it affects the "unrefuelled range" of a zero-emissions car. The other measure of merit is thermodynamic efficiency, which affects the cost of operation. Higher efficiency, lower cost, is better. None of the existing vehicles powered by air or steam is efficient; they waste energy. Either compressed air or steam involves losing heat from the system, hence lower efficiency, higher costs. However, to make this clear, there follows a comparison of three energy storage processes, as might be applied to a zero emissions vehicle.

For illustative purposes, keeping the engineering challenges within the state of the art, assume that temperatures may not exceed 600K, a value chosen as metallurgically acceptable. Environmental effects must also be considered. Exhaust temperatures are limited, as a lower bound, to 200K, which is still frighteningly cold. Common lubricants thicken at such temperatures. Human contact with such exhaust would result in frostbite, and, as the cold exhaust mixed with ambient air, fog and/or snow would result. The same size storage tank is assumed for each system, conveniently 1000 L, 1 m$^3$. Such tankage would fit behind the seat of a small car, or under the bed of a pick-up truck. A specially built vehicle could accomodate more tankage.

The following calculations make certain assumptions as listed. Purists will argue that they are imprecise, but they are adequate to compare systems.

1. Air is an ideal gas. k=1.4; PV=RT, where R for air is 0.28 KJ/(kg-K) or 2.8 L-bar/(kg-K) ; for isentropic processes, $T_2/T_1=(V_1/V_2)^{k-1}$; $P_2/P_1=(V_1/V_2)^k$; Work at 100% eff. is $(U_1-U_2)=\text{mass}(C_V)(T_1-T_2)$. $C_V$=0.75 kJ/kg-K (It is not constant, but let's assume it is) The work done to compress the air isothermally (impossible in practice, but assumed here) is $P_1V_1 \ln(V_2/V_1)$. Ambient air, the intake to the compressor, is at 300K, 1 bar pressure, with a density of 1.18 g/liter. Exhaust pressure cannot be below 1 bar.

2. Steam behaves as listed in steam tables.

3. Efficient expanders (motors) with variable expansion ratio and no internal friction are available. (Zero friction is impossible, but assuming it treats all the systems equally with regard to friction losses)

4. Another assumption, which can be questioned, is that all the stored gas is useable. Clearly, as the pressure drops, the expansion ratio of the motor must decrease, but assuming a variable expansion ratio (which may be achieved with valve timing) for comparison purposes, there is no big error involved in calculating energy density or efficiency. Batteries, of course, cannot be totally discharged, either.

Process A: Energy storage with dry compressed air.

The Pneumocon Inc. car, "Spirit of Joplin", now running in Joplin, Mo., uses air stored at 3000 psi (about 200 bar) and ambient temperature, about 300K. The output is throttled, to reduce pressure to 33 Bar, still at approximately 300K, but if expansion is limited by the temperature of the exhaust the power output and efficiency remain essentially unchanged over a broad range of pressures. A thousand liters of air at 200 bar would weigh 236 kg. The energy output, ideally, would be (236 kg.) (0.75 kJ/kg-K) (300K-200K)=17.7 megajoules (4.9 kw-hr). The work required to compress the air isothermally would be $P_1V_1 \ln(V_2/V_1)=(10^5 \text{ N/m}^2)$ (200 m$^3$) (−5.52)=110 megajoules. Efficiency, useful output divided by energy input, is 17.7/110 or 16 per cent. (Typical industrial compressed air systems rarely exceed 15 percent overall efficiency)

Suppose, in an effort to improve energy storage density, the pressure is increased to 600 bar, which is acheivable with available components. The amount of air stored will triple, as will the weight of the tanks, approximately, as the walls will be thicker. Now the output will be tripled, to 53 megaJoules, 14.7 kw-hr, and the input will be 384 megaJoules. Efficiency would drop to 14 percent. Since the energy density increase is large for a small drop in efficiency, high pressures seem desireable.

Process B: Storing compressed air at 600K.

A multistage compressor would compress the air until it reaches 600K, the maximum temperature allowed, then compress it isothermally until the pressure reaches 200 Bar. The tank will hold only 118 kg of air at that temperature. The first compression adds energy to the air (isentropically), 0.75 kJ/K or 225 KJ/kg, which is 26.6 megaJ total for the first stage. The pressure is 11.7 bar and the volume 17 m$^3$. The isothermal compression to 1 m$^3$ and 200 Bar consumes 56.3 megaJ, for a total of 82.9 megaJ. When the air is expanded with a temperature drop of 400K, the energy recovered is 35.4 megaJ, 9.8 kw-hr, with an efficiency of 43 percent. During the isothermal compression, about 56 megajoules of heat is rejected (since the internal energy, U, of the compressed air was not increased).

Suppose we prefer to store the air at 450 bar. We can store 265 kg of air, 22 kw-hr, but the energy to isothermally compress the air has risen to 163 megaJ, 189 MJ total input, for an output of 79.6 MJ, or an efficiency of about 42 percent. Again, higher pressures seem better. Since tanks are likely to be stronger at 300K than at 600K, the 450 bar and 600K process and the 600 bar at 300K process are likely to be comparable in weight. It would seem Process B is superior, with higher efficiency and higher energy density.

Process C: Energy storage in steam.

The greatest energy density occurs when we fill the tank with saturated steam at 600K (maximum temperature allowed). The pressure is about 125 bar, specific volume is 13.5 L/kg, U=2500J/kg, entropy=5.47. The mass of steam in the 1000 L is about 74 kg. Total internal energy, U, is 185 megaJoules. Since we started with 74kg. of liquid water at 300K, which had an internal energy of 8 megaJoules, the work required to fill the tank with steam was approximately 178 megaJoules or 49 kw-hr.

Now, we need to know how much mechanical energy we can extract from that steam. The perfect expansion process is isentropic; total entropy remains the same. However, we know that as the steam does work it will cool, and some will condense. (Steam is not an ideal gas) At 1 Bar (exhaust), we will have X kg of steam and (74-X)kg. of water, both at about 373K. Water at that temperature has entropy=1.30 and steam has 7.35. X(7.35)+(74-X)(1.30)=74(5.47) It follows, after a bit of elementary algebra, that the exhaust had 51 kg of steam and 23 kg of water. The total internal energy of the exhaust is 51 kg(2506 kJ/kg)+23 kg(419kJ/kg)=137.4 megaJoules. Subtracting that from the initial enegy, we find that the greatest possible mechanical work we could get from the steam system is 40.6 megaJoules or 11.3 kw-hr., and the efficiency is only 23 percent. The exhaust is dangerously hot, and it cannot be exhausted directly from a vehicle without creating fog and raining on the following vehicles; a big condenser is needed.

Summary of characteristics of the three ideal processes:

|  | useful output | efficiency | fuel cost |
|---|---|---|---|
| A: 300K compressed air | 14.7 kw-hr | 14% | 7 |
| B: 600K compressed air | 22 kw-hr | 42% | 2.4 |
| C: 600K steam | 11.3 Kw-hr | 23% | 4 |

Arguably, any of these state-of-the art processes is competitive with electrochemical batteries. A battery powered car typically stores about 20 kw-hr of energy; when that is exhausted, it takes hours to recharge the batteries. Power output is limited to approximately 200 W per kilogram of battery, so the power to weight ratio is poor. Compressed gas vehicles can release stored energy at much higher rates and can be recharged from a stationary "filling station" in minutes.

Relatively inexpensive and non-toxic materials are used (mainly ferrous metal technology) in the three systems described, and there is little to wear out; no expensive batteries are used which need periodic replacement/ recycling. (The cost of recycling the batteries periodically overwhelms the cost of electricity) The impracticality of electric cars is nicely described in the February 1995 issue of *Popular Science* in an article titled, "It's The Battery, Stupid!" A December 1994 report, "Electric Vehicles", by the U.S. General Accounting Office, concludes, "The ultimate viability of EVS as a widespread tranportation option cannot now be ensured." Economics favor compressed gasses over electrics, both in low operating cost (no recycled batteries) and in first cost; an electric van from Chrysler is priced at $120,000, while an air-powered vehicle need not be substantially more expensive than current vehicles; it is mechanically simple (eg. simple or no transmission, no radiator, no ignition system, no catalytic converter, etc.).

Most of the disadvantages of batteries in vehicles also apply to stationary storage schemes. Telephone companies use a lot of batteries, now, but it is hard to imagine a public electric utility load-levelling with batteries. However, large storage tanks at elevated temperatures appear to be feasible, perhaps underground or under water or in remote locations, to allay public fears of an explosion and to minimize real estate costs.

Parenthetically, hydrogen-air fuel cells might compete as sources of power for vehicles, but there will be "consumer resistance" to hydrogen in cars. Will they be allowed in tunnels? A fuel-cell powerplant in New York City was vetoed by the city fire department.

SUMMARY OF THE INVENTION

This invention discloses a process of storing and transmitting/converting energy by (a) compressing a working fluid, (b) adding a coolant fluid during the compressing operation and (c) storing the mixed working and cooling fluids in a pressure vessel, and then (d) expanding the stored mixture as through a fluid motor to extract energy from the compressed mixture. In addition, a further step of (e) condensing and returning coolant fluid may also be utilized.

Accordingly, several objects and advantages of my invention are:

(a) To provide an energy storage process which is more efficient than present methods of energy transmission and energy storage. (b) To provide a way to achieve high-density energy storage.

(c) To provide a process which can be scaled for large applications (utilities) or small (portable tools).

(d) To provide a power transmission process (eg. from engine to multiple powered wheels or fork lift) which is simpler and more convenient than commonly used means, such as shafting or conventional hydraulics.

(e) To provide an energy storage process which requires no breakthroughs, uses non-toxic materials and well understood mechanisms.

(f) To provide a means of energy storage which can be charged and discharged at very high rates.

(g) To provide a process which, considering capital and replacement costs, is more economical than existing methods of energy storage, such as batteries.

(h) To provide for the use of high-pressure gasses without the high temperatures associated with high-pressure gasses compressed isentropically and without the wasted heat energy associated with isothermal compression.

(i) To provide a process which facilitates heating and cooling.

REFERENCE NUMERALS IN DRAWINGS

Comparable elements of each process bear the same number in each applicable figure. Not shown are valves and controls, coolant pumps, etc., which are obvious to anyone skilled in the art.

110: Energy input (eg. a turning shaft)
120: One or more compressors
130: Working fluid input to mixer.
140: Coolant input to mixer.
150: Mixer
160: Storage tank or tanks, insulated, as desired.
170: Expander (eg. motor or pneumatic cylinder)
180: Exhaust from expander.

190: Energy output from expander.

282: A device for removing coolant droplets from the working fluid.

284: Dry working fluid is exhausted.

286: Storage tank(s) for recovered coolant.

386: Storage container(s) for mixture of low-pressure working fluid and coolant.

420: Compressor(s) cooled by coolant.

421: Conduit for dry working fluid to expander(s).

422: Conduit for coolant to expander(s).

481: Conduit for low-pressure working fluid, returned to compressor(s).

482: Conduit for coolant, returned to compressor(s)

The invention consists of a process in which mechanical energy is expended to compress gasses and said energy is recovered by passing the gasses through an expander (motor) to provide mechanical energy again. The novelty lies in the use of two fluids, a fluid with a high heat capacity to cool the compressor(s) and a second, working, fluid. The cooling fluid may undergo a phase change from liquid to gas, absorbing "latent heat of vaporization", which keeps the temperature of the combined compressed gasses lower than would be the case if isentropic compression of the working fluid were involved. The key point is that the heat absorbed by the cooling fluid is not wasted, as it would be with conventional (isothermal) compression. Heat from the cooling fluid is used to counteract the cooling which results from the expansion of the working fluid as it drives the motor, resulting in a process which is thermodynamically reversible, ideally efficient, in contrast to existing fluid power systems. (This is not to be confused with humidified compressed air, the CASH cycle)

Figure 1:
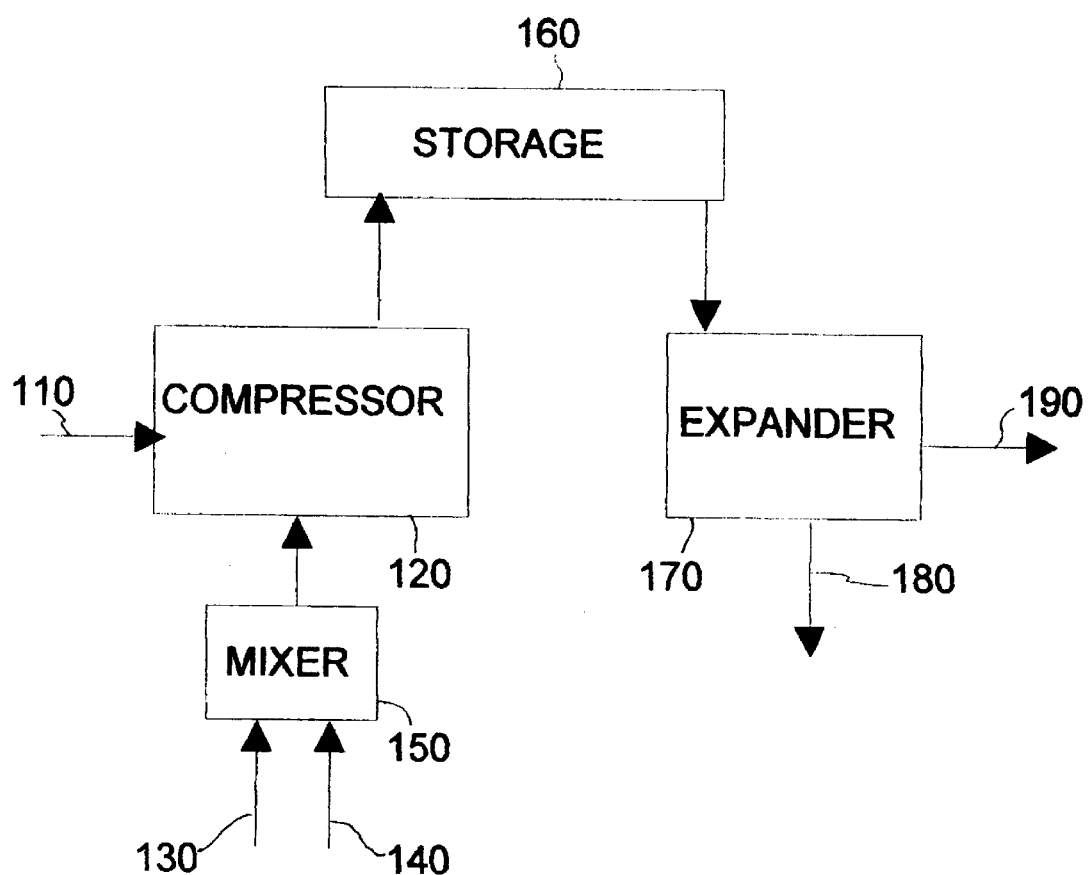
FIG. 1 shows a flow chart of the essential process.

FIG. 1 illustrates the basic process as a flow chart. One or more compressors, 120, are driven by energy input, 110. A working fluid (conveniently air), 130, is mixed with coolant fluid (conveniently water), 140, in a suitable device, similar to devices for mixing fuel and air, 150, and the mixture is fed to the compressor. Upon compression, the air gets hotter and the water droplets suspended in the air turn to steam, absorbing a great amount of heat which would otherwise be wasted by the necessity to cool the compressor. The mixture of air and water/steam may optionally be stored in an insulated tank or tanks, 160, until energy is needed. To recover the energy used during compression, the mixed gasses are conducted to one or more expanders, 170. As the gasses expand, doing work, providing an energy output, 190, the gasseous coolant condenses, releasing heat which it previously absorbed in the compressor. The exhaust of expander(s), 180, is close to the same temperature as the fluids fed to the compressor; hence energy lost as waste heat is minimal.

Figure 2:
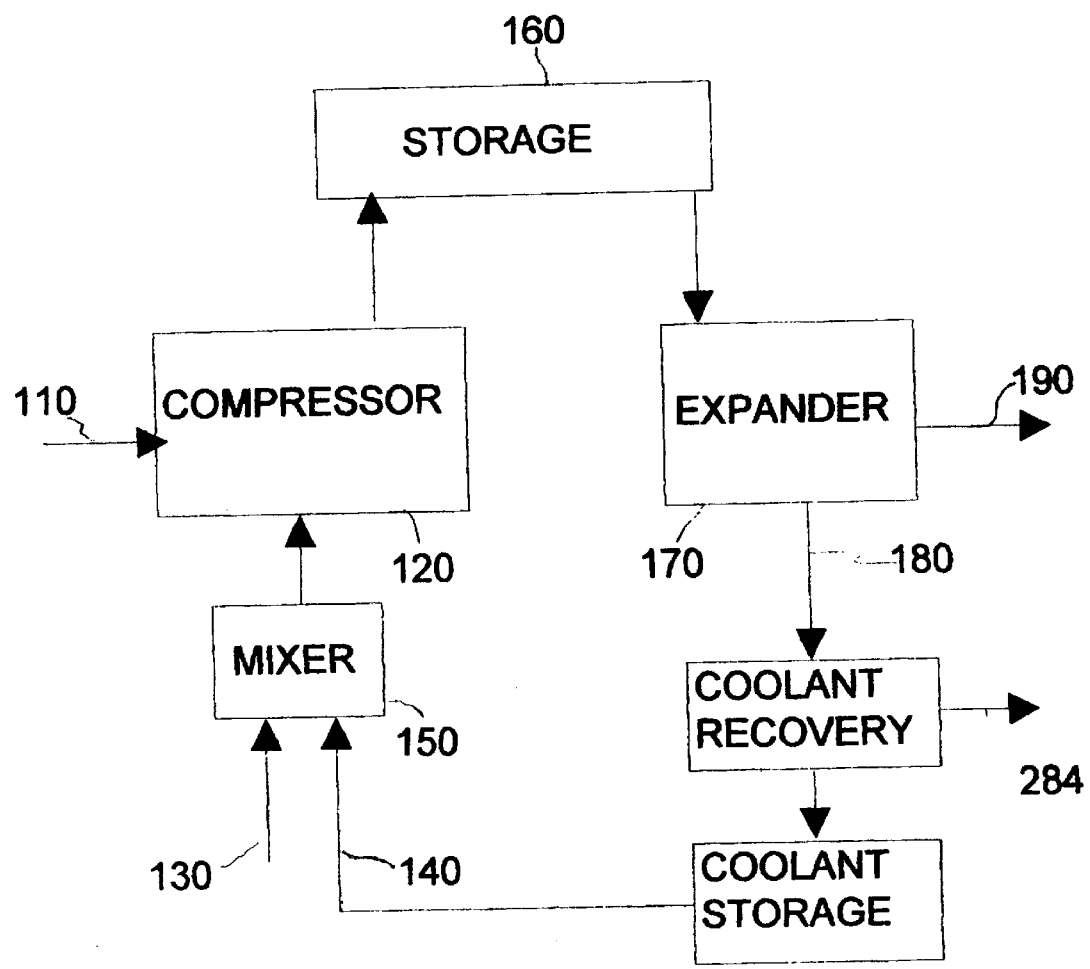
FIG. 2 shows the addition of recycling a coolant.

FIG. 2 illustrates a modification of the process in FIG. 1, with enegy input, 110, compressor(s), 120, storage tank(s), 160, and expander(s), 170. In addition, the exhaust, 180, is passed through a filter or particle separator or other means, 282, to remove the coolant droplets from the exhaust, and the dry working fluid is exhausted, 284. The coolant may be stored in tank(s), 286, and reused, sent back to the mixer, 150. This has two beneficial effects; it conserves coolant, and it prevents negative effects on the environment which might result from releasing a cloud of coolant droplets. Again, pumps, controls, valves, etc. which are obvious are omitted.

Figure 3:
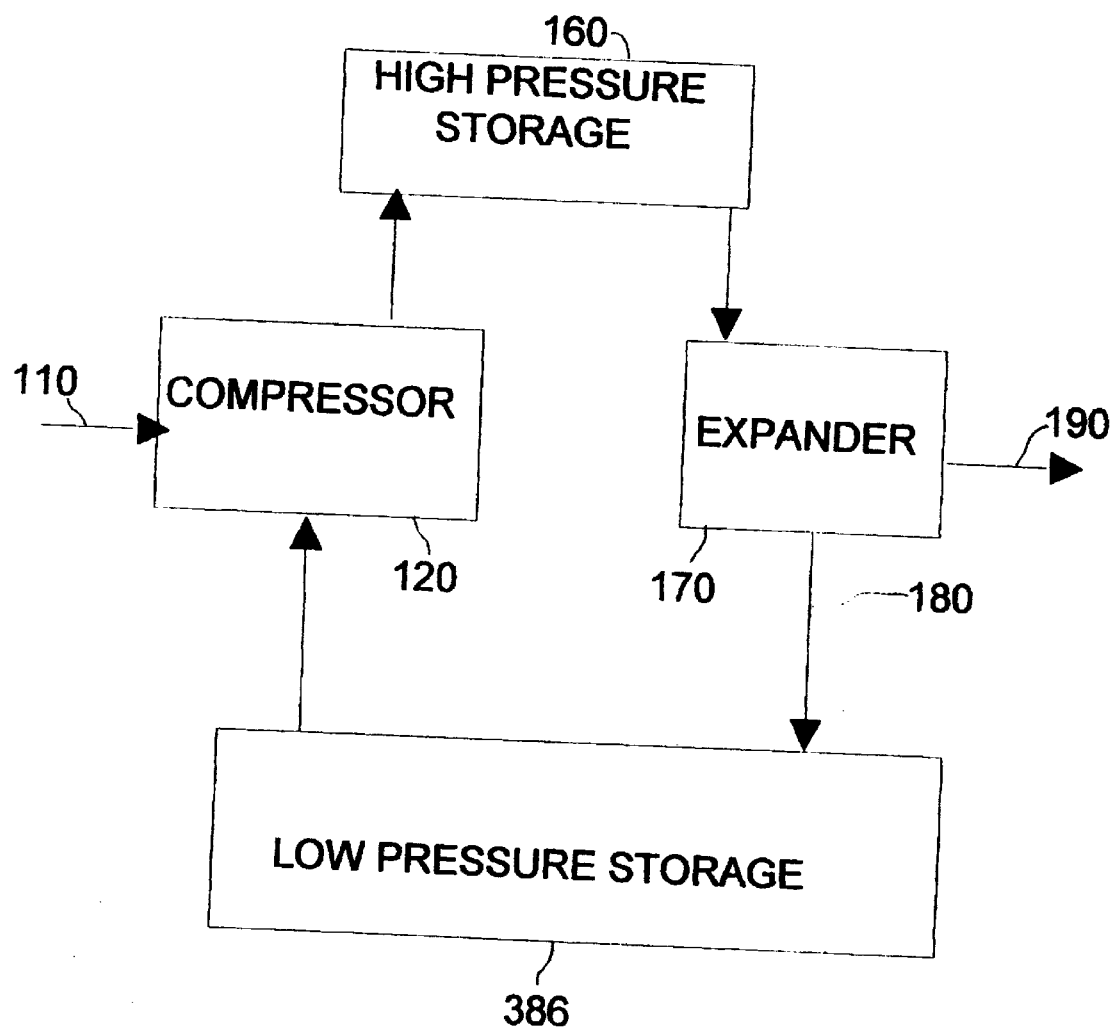
FIG. 3 shows a closed-cycle process in which the mixed working fluid and coolant are reused—useful for power transmission.

FIG. 3 illustrates a closed-cycle version of the process, with compressor(s), 120, and expander(s), 170. The mixed working fluid and coolant, 180, are directly recycled, with (optionally) storage tanks, 160 and 386, to accomodate variations in flow. This process may be preferred for simply transmitting energy from one place to another, but the storage capacity will be limited because the low-pressure working fluid exhausted from the expander(s) will consume an inconveniently large volume and the coolant droplets may not remain suspended in the working fluid.

Figure 4:
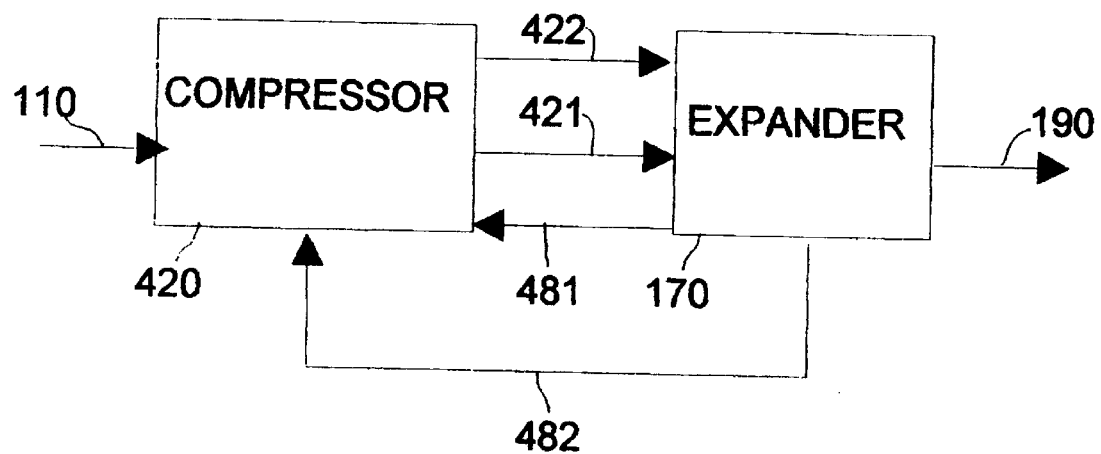
FIG. 4 shows a modification of the process of FIG. 3, in which the coolant and working fluid are kept from mixing.

FIG. 4 illustrates a process in which the working fluid and the coolant are not mixed but are kept physically separate, with conductive heat transfer cooling the working fluid at the compressorts) and heating the working fluid at the expander(s). The compressor(s), 420, are different from 120 in that they are cooled by circulating coolant (in a "water jacket" or intercoolers) which is transfered by insulated conduit, 422, to the expander(s) 470. The compressed, dry working fluid goes to the expander(s) though a separate conduit, 421. At the expander 470, the working fluid is warmed by the coolant, most conveniently with heat exchangers between stages of a multi-stage expander (not required when the fluids are mixed). The separate fluids are returned to the compressor(s) through conduits, 481 and 482. It might be advantageous to use alternative fluids in special circumstances, aboard spacecraft or submarines, for example, where the fluids (eg. helium and a liquid metal, or various organic substances) would be recycled in a closed system.

Operation

The operation of the process is illustrated by use for a zero-emissions vehicle, though the process is amenable to a variety of uses. Using the same assumptions as described under Prior Art, the superiority of my invention is obvious. It can be called "Process D." The working fluid is air, and the coolant is water, resulting in what I call "wet compressed air" (WCA).

The use of a mixture of steam and air appears to be novel and not obvious, as indicated by the lack of literature references to the practice. There are references to warming air with steam, to ameliorate the chilling effect of the exhaust of air tools in mines, but the steam was not generated by the compression of the air. Handbooks and texts on compressed air technology typically stress the desireability of removing moisture from the air, not adding it. It appears that the patent classification list has no sub-class for power plants which mix steam with air in a context which does not involve combustion; hence a search turned up no relevant patents.

Process D: Energy storage in WCA.

This process resembles Process B (in Prior Art), except that the intercooler is missing. Instead of throwing away about half the input energy, the heat of compression is used to make steam, which is conserved. Let's assume water is mixed with the air at the compressor as in FIG. 1 and FIG. 2. As the air is compressed, the temperature increases, vaporizing the water droplets, so that a mixture of steam and air passes to the storage tanks. 118 kg of air is pumped into the tank at 600 K, with an increase of internal energy of 26.6 MJ. However, the mass of air in the tank is less (60+%), because there is now steam in the tank, also, from water boiled during the compression process. The energy used to compress the air rises to approximately 66.5 megaJoules and that energy is making about 30 kg. of steam, with the partial pressure of the air approximately 330 bar and the partial pressure of steam 125 bar, for a total pressure of 455 bar, which is feasible. (The mass of the contents is about 115 kg less than Process B at 450 bar) The total energy in the tank, at 600K, is now about 93 megaJ, the same as the input energy, since no heat was rejected from the insulated system. Now, when the mixture is expanded, isentropically, the exhaust at 1 bar is at the original temperature, 300K, and no energy is lost in the exhaust. The steam condenses to water droplets, and the heat released as it condenses expands the air, so all the energy is recovered. The compression-boiling and expansion-condensation is a thermodynamically reversible process. The energy output is the same as the energy input, 93 MJ or about 26kw-hr. The WCA tank and motor can be in a vehicle, while the compressors and bulk storage tanks are at various filling stations, with quick-disconnect hoses to recharge the vehicle, or the vehicle can be a hybrid, with an engine and compressor in the vehicle.

Summary of characteristics of the processes:

|  | useful output | efficiency | fuel cost |
|---|---|---|---|
| A: 300K compressed air | 14.7 kw-hr | 14% | 7 |
| B: 600K compressed air | 22 kw-hr | 42% | 2.4 |
| C: 600K steam | 11.3 Kw-hr | 23% | 4 |
| D. 600K WCA | 26 kw-hr | 100% | 1 |
| E. Electric batteries | 20 kw-hr | 85% | High* |

*The cost of parking at a recharge station and of replacing the batteries overwhelms the cost of the electricity.

Process D, Wet Compressed Air (WCA), is the clear winner in energy density, cost, and environmentally harmless exhaust (ambient temperature air with droplets of water which can be filtered out and recycled). It is useful over a wide range of temperatures and pressures.

Summary and Ramifications

The invention improves the efficiency of compressed-gas energy transmission/storage by factors of 2–7. The heat normally wasted by cooling the gas and compressor is retained in a coolant and returned to the gas during excpansion, approximating an ideal, reversible thermodynamic process. Therefore, the cost of compressing the gas, the fuel cost, is reduced, making the novel process economically and environmentally preferable to other processes for storing energy. It is also, generally, safer to use, as a leak will exhaust ambient temperature gasses and droplets of coolant, innocuous as compared with hot steam, cold air, or battery acid.

A few utilities store off-peak energy with caverns full of compressed air and use the compressed air to generate electricity during periods of peak usage. The invention would make this much more efficient, therefore more economical. Because the energy can now be stored efficiently, in relatively low-cost containers, a number of applications are feasible. Used in a small scale, the "Process D" could power portable tools, lawnmowers, self-launching gliders, boats, and the like, with little noise and no pollution. Inconstant sources of energy, such as wind turbines, can drive compressors, piping the "WCA" to a central storage and electric generating facility. This would eliminate the considerable difficulties of using a variable-speed turbine to generate 60 Hz. alternating current, phase matched with the power grid. Because the energy can be stored in insulated tanks, it would be more practical to use the wind turbines, tidal turbines, a space-based microwave system, solar energy, or even internal combustion engines as energy sources than is the case now; energy would be available on demand, even if the wind was calm, the tide slack, etc. Further, "WCA" can be used for space heating in its compressed form. If heat is rejected before expansion, heating something else, the exhaust will be cool and applicable to refrigeration or air conditioning.

The invention, as illustrated in "Process D", used in a zero-emissions vehicle, can surpass any existing environmentally benign vehicle in efficiency, low cost, acceleration, and fast recharging—minutes rather than hours. By way of comparison with electric cars, such cars typically store about 20 kw-hr of energy, with an overall efficiency of perhaps 85 per cent, so the "unrefuelled" range of a WCA-powered vehicle (26 kw—hr) should be at least as good as a state of the art electric vehicle. However, the WCA car can be refuelled in less than five minutes (via a quick-disconnect hose), vs. hours, and there is virtually no limitation in the rate of "discharge". (The best batteries yeild only about 200 W per kilogram, which give the electric car a poor power to weight ratio) Hence a WCA car with 1000 liters of tankage (comparable in size and weight to batteries) could outperform any electric car, winning a short race with greater speed and acceleration, winning a long race by means of shorter "pit stops". If WCA were supplied by ordinary gasoline filling stations, a WCA car could achieve the same range, the same miles per day in intercity travel, as a gasoline-powered car. Relatively inexpensive and non-toxic materials are used (mainly ferrous metal technology), and there is little to wear out; no expensive batteries which need periodic replacement/recycling. In the event of accident, no dangerous materials are released, just air and water at ambient temperature. WCA energy storage is "environmentally friendly." The recycling of automobile batteries, even now, is a great concern to EPA and OSHA; yet electric automobiles will multiply those problems a hundredfold. If electric cars are built in the millions, what will happen to the price of lead? (Nickel? Cadmium?) Who will build the new mines and smelters to meet the demand for millions of tons of toxic metal? How long will it take to get the environmental impact assessments approved? How will the millions of charging stations needed, approximately one per car, be built, and who will pay for them?

In summary, this invention, "WCA", is a novel technology with distinct advantages over existing methods of energy storage. It can be portable or stationary, with a high effective energy density. It is efficient and economical. It is non-toxic and kind to the environment. In the case of a transportation system, using WCA-powered vehicles, the rapid refill allows a vastly simpler infrasructure for "recharging" the vehicles. WCA could be dispensed at ordinary filling stations, would not requiring parking the vehicles for hours at electrical recharging stations. (Even if the electricity is cheap, a "wired" urban parking space won't be) WCA can be generated by any means capable of driving a pump: eg. off-peak electricity, wind turbines, solar Stirling engines, natural gas engines, even tidal power. It can be stored economically for long periods in insulated tanks and lends itself to large-scale energy storage. (A million kw-hr storage tank would be inexpensive compared to equivalent batteries, and would not require opening new mines and smelters to provide the toxic materials needed for batteries) Consequences of using the WCA process include the following:

1. Electric cars will become an historical curiosity, with no attractiveness to consumers, since a WCA car will cost less to buy, cost less to run, and will out-perform an electric car.

2. Considering the total system, power generation, distribution, etc., and the lesser infrastructure required to sell WCA to the public, WCA will be more efficient, less polluting, and easier to implement.

3. It will be more efficient than current load-leveling systems, used by a few utilities, which involve storage of dry compressed air, underground. Therefore, the environmental effects and costs of large-scale energy storage will be less.

4. WCA can be applied to wind or solar systems (or even space-based microwave energy systems) to store energy and would be especially useful in places (the polar regions, islands, third world countries, mountain tops) where diesel fuel and commercial electricity are hard to get.

5. WCA can be used for heating and cooling purposes.

6. WCA can be used in "portable" applications: robots, naval torpedos, unmanned aircraft, off-road vehicles (with "free" power takeoff for fork lifts, etc.), toys, etc.

I claim:

1. A process for storing and transmitting energy comprising the steps of
   a) compressing a gaseous working fluid with a compressor apparatus employing input mechanical energy, thereby creating heat energy in the working fluid and the compressor apparatus,
   b) cooling the working fluid and the compressor apparatus by mixing with the working fluid a coolant fluid which absorbs heat energy from the working fluid and the compressor apparatus while mixing with and being compressed with the working fluid,
   c) storing the compressed mixture of working fluid and cooling fluid in a pressure vessel, and
   d) withdrawing the compressed mixture from the pressure vessel through an expander which extracts mechanical energy from the compressed mixture.

2. The process defined in claim 1, further including the step of (e) collecting the cooling fluid from the expanded mixture and returning the collected cooling fluid to the compressor apparatus.

3. The process as defined in claim 1, wherein the mixing of the working and cooling fluids occurs prior to the intake of fluids to the compressor apparatus.

4. The process defined in claim 1, wherein the working fluid is air and the cooling fluid is a phase change fluid which will undergo a phase change expansion thereby absorbing heat from the working fluid and the compressor apparatus.

5. The process of claim 4, wherein the cooling fluid is water.

6. A process for storing and converting energy comprising the steps of
   a) compressing a gaseous working fluid with a compressor apparatus employing input mechanical energy, thereby converting the mechanical energy into heat erergy in the working fluid and in the structure of the compressor apparatus,
   b) cooling the working fluid and the structure of the compressor apparatus during the compressing step by mixing with the working fluid a coolant fluid which absorbs as heat of vaporization some of the heat energy from the working fluid and from the structure of the compressor apparatus while being compressed with the working fluid,
   c) then storing the compressed mixture of working fluid and cooling fluid to provide a depletable energy source in a transportable vessel, and
   d) withdrawing the compressed mixture from the vessel through an expander to extract heat energy from the compressed mixture and to convert the heat energy to mechanical energy and also to exhaust some of the mixture at a substantially lower state of compression whereby at least some of the cooling fluid condenses to liquid form.

7. The process defined in claim 6, including the further step of (e) collecting the condensed cooling fluid from the exhausted mixture and returning the collected cooling fluid to the compressor apparatus.

8. The process of claim 7, including the further step (f) of collecting the expanded working fluid and returning the collected working fluid to the compressor apparatus.

* * * * *